(12) United States Patent
Roux

(10) Patent No.: US 7,113,167 B2
(45) Date of Patent: Sep. 26, 2006

(54) AIRCRAFT DIALOG DEVICE, FOR DIALOG WITH A SYSTEM OF SAID AIRCRAFT

(75) Inventor: Nicolas Roux, Toulouse (FR)

(73) Assignee: Airbus France, Toulouse (FR)

( * ) Notice: Subject to any disclaimer, the term of this patent is extended or adjusted under 35 U.S.C. 154(b) by 260 days.

(21) Appl. No.: 10/062,671

(22) Filed: Feb. 5, 2002

(65) Prior Publication Data
US 2002/0118166 A1 Aug. 29, 2002

(30) Foreign Application Priority Data
Feb. 26, 2001 (FR) .................................. 01 02566

(51) Int. Cl.
*G09G 5/00* (2006.01)
(52) U.S. Cl. ...................... 345/156; 345/157
(58) Field of Classification Search ........ 345/156–157, 345/856–860, 160, 173, 672; 715/856, 750, 715/751, 754, 809; 701/14
See application file for complete search history.

(56) References Cited

U.S. PATENT DOCUMENTS

| 5,021,771 | A | * | 6/1991 | Lachman .................... 345/164 |
| 5,475,594 | A | * | 12/1995 | Oder et al. .................... 701/14 |
| 5,548,304 | A | * | 8/1996 | Yoshino et al. ............. 715/856 |
| 5,666,499 | A | | 9/1997 | Baudel et al. ............... 345/808 |
| 5,694,150 | A | * | 12/1997 | Sigona et al. ................ 345/856 |
| 5,905,497 | A | * | 5/1999 | Vaughan et al. ............ 345/672 |
| 5,956,019 | A | * | 9/1999 | Bang et al. .................. 345/173 |
| 6,057,786 | A | | 5/2000 | Briffe et al. ................. 340/975 |
| 6,072,473 | A | * | 6/2000 | Muller et al. ................ 345/173 |
| 6,112,141 | A | | 8/2000 | Briffe et al. .................. 701/14 |
| 6,381,519 | B1 | * | 4/2002 | Snyder .......................... 701/3 |

FOREIGN PATENT DOCUMENTS

FR 2677149 12/1992
FR 2743921 7/1997

* cited by examiner

*Primary Examiner*—Richard Hjerpe
*Assistant Examiner*—Kevin M. Nguyen
(74) *Attorney, Agent, or Firm*—Stevens, Davis, Miller & Mosher, LLP

(57) ABSTRACT

A dialog device includes at least one screen displaying responsive objects on at least two interactive windows. An actuatable cursor control device of the dialog device has a device for displacing a cursor on one of the interactive windows to designate and confirm a responsive object, so as to initiate execution of an associated function. An actuatable auxiliary control device of the dialog device controls an auxiliary object marker without affecting the control of the cursor. The actuatable auxiliary control device includes a device for discretely displacing the auxiliary object marker on an interactive window and confirming a responsive object indicated by the auxiliary object marker, so as to initiate execution of an associated function.

16 Claims, 3 Drawing Sheets

AIRCRAFT DIALOG DEVICE, FOR DIALOG WITH A SYSTEM OF SAID AIRCRAFT

BACKGROUND OF THE INVENTION

This invention concerns a device for dialog between at least one operator of an aircraft and at least one system of said aircraft. This system includes the functions which are liable to be initiated by said dialog device, under the action of the operator, so that they can be executed.

In the context of this invention:
"execution of a function" means, in particular:
  implementing a command to an element (engine, lighting, etc.) of the aircraft, or a particular action;
  data entry;
  access to pages of information on a screen; and/or
  access to additional information or actions without changing page;
said system, e.g. a flight management device, may include "procedures" for navigation, communication, monitoring and/or flight management of the aircraft, and "procedures" for managing elements such as engines or lighting, or alarms of said aircraft.

The dialog is implemented via at least one window which is displayed on at least one screen, in general a screen on the flight deck, and which is of "interactive" type. In the context of this invention, "interactive window" means a window which includes responsive objects (points, ranges, alphanumeric values, lists, menus, etc.) which are associated respectively with particular functions of the abovementioned type, and which respond to the presence of a cursor. Said cursor can be displaced by an appropriate device which can be actuated by an operator of the aircraft, in such a way that it can be displaced to a responsive object to designate or mark it. When a responsive object is designated, i.e. when the cursor is displaced to it, said responsive object is marked or highlighted, in particular by a change of appearance such as a change of color or increased brightness. The responsive object is then said to have an "object marker" or "focus".

Confirmation (using an appropriate controllable device) of a responsive object which has such an object marker initiates the execution of the function which is associated with said responsive object.

DESCRIPTION OF THE PRIOR ART

Various dialog devices which are capable of implementing the designation and confirmation of a responsive object of this type are known.

In particular, from Patent FR-2 677 149, a device for reviewing the lateral flight plan of an aerodyne is known. This known device includes a designation device which is fitted with a confirmation element, and which is connected to the processor of the flight management system of the aerodyne in such a way as to obtain, on the screen of this system, as well as the geographical representation of the flight plan which the pilot initially selected:
  a responsive field associated with each point of the screen;
  dynamic function ranges which are used to compose menus; the function which is assigned to each of these ranges can vary from one menu to another and is indicated on the display corresponding to this range; and
  a luminous index, the movements of which on the screen are controlled by the pilot acting on the designation device, in such a way that the index can be displaced to a range or a responsive field;
  the function which corresponds to this range is activated, or a point of said area is selected, by the pilot acting on the confirmation element.

Additionally, from Patent FR-2 743 921, a device, which is part of a global control system of an airplane, to aid aerial navigation of the airplane, is known. This system includes, in particular, a Flight Management System (FMS) and interfaces for dialog with the pilot, including, among other things, information display screens for navigation and piloting, and a display and data entry console of Multipurpose Control Display Unit (MCDU) type. This MCDU console includes a keyboard which is exclusively intended for data entry, a screen and devices to make it possible to select fields which are displayed on the screen and to activate the selected field to initiate operations which are related to what is displayed. These selection and activation devices make it possible to:
  displace a cursor in a menu which is displayed on the screen, to select a field which this menu offers; for instance, the brightness of this field increases when the cursor is displaced to this field; and
  to activate a selected field.

Functions which are initiated in this way (designation of the associated responsive object and confirmation) by the dialog device are, in general, functions which were planned in advance and carried out at a particular moment during, before or after the flight.

However, it may happen during a flight (or even before or after the flight) that the crew of an aircraft is obliged, sometimes urgently, to carry out particular actions, i.e. is obliged to initiate execution of particular functions, which cannot be anticipated. This is in general the case when the pilot is alerted by various systems of the aircraft to a change in the operational situation of said aircraft, requiring him or her to deal with it urgently, e.g. dealing with a failure or generating a response to an Air Traffic Control (ATC) message.

Now, at the moment when such a request to deal with something occurs, it is possible that the pilot is in the course of initiating execution of another function, which may be habitual or not, and the cursor has been displaced to the corresponding window for this purpose.

In such a situation, with the dialog devices which are disclosed by the abovementioned Patents FR-2 677 149 and FR-2-743 921, the pilot has two options:
  either he or she interrupts the function which is in course of execution and displaces the cursor to the window which contains the new function (e.g. an emergency function), to designate and confirm the responsive object which is associated with this new function;
  or he or she waits, before initiating the new function, until the function in progress has been fully executed.

Of course, neither of these possibilities is satisfactory.

It should be noted that, in the case of a dialog device such as is described in document U.S. Pat. No. 6,112,141, containing two cursor displacement devices each of which is capable of controlling one cursor, and which are intended for two different operators (e.g. the pilot and copilot of the aircraft), the emergency function can be initiated by the operator who is not controlling the function which is being executed, obviously in the case that this operator is not controlling any function.

Said document U.S. Pat. No. 6,112,141 describes a flight deck which contains, in particular, multiple screens, a multi-functional control unit, two keyboards (or voice-operated systems) which are exclusively intended for data entry, and a dialog interface. This dialog interface includes at least two identical cursor control devices, in the form of control balls or spheres, one of which is intended for the pilot and the other for the copilot. These control balls make it possible to displace the corresponding cursors continuously on the screens, to designate responsive objects. Additionally, in the case that two different cursors designate the same responsive object, the command from the cursor which did the designation first has precedence, because no priority is provided between the different operators.

However, in the case that the two operators are both in the course of initiating execution of functions using their dialog devices, or in the case that one of the two is occupied on other tasks, if an emergency function has to be executed, the situation is the same as before, with the same dilemma, i.e. whether to interrupt the function in progress and initiate execution of the emergency function, or to terminate the function in progress before initiating execution of the emergency function.

SUMMARY OF THE INVENTION

This invention concerns a dialog device which is of the type described above, and which makes it possible to overcome the above-mentioned drawbacks.

For this purpose, according to the invention, said device for dialog between at least one operator of an aircraft and at least one system of said aircraft, said dialog device including:

at least one screen which is capable of displaying at least two responsive objects on at least two interactive windows, each of said responsive objects being associated with one of multiple functions, said functions being capable of being initiated by said dialog device under the action of the operator so that they are executed; and at least one cursor control device, which is arranged so that it can be actuated by said operator, and which includes at least:

one actuatable displacement means, which is capable of displacing a cursor on a window, in order to designate a responsive object by making a main object marker appear; and one actuatable confirmation means, which is capable of confirming a responsive object which has said main object marker, in order to initiate execution of the function which is associated with said responsive object, is notable in that it includes, additionally, auxiliary control means which are arranged in such a way that they can also be actuated by said operator, which are intended to control an auxiliary object marker without affecting control of said main object marker, and which include:

at least one actuatable displacement element, making it possible to cause a discrete displacement of said auxiliary object marker, responsive object by responsive object, on an interactive window; and at least one actuatable confirmation element, making it possible to confirm a responsive object which has said auxiliary object marker, in order to initiate execution of the function which is associated with said responsive object.

Thus, when, during execution of a particular function (which has been controlled in the usual way by designating and confirming a responsive object using said cursor control device controlling the cursor), another function, in particular an emergency function, must be executed, the operator (who has access to both said cursor control device and the auxiliary control means), can initiate execution of this other function using said auxiliary control means, since the auxiliary object marker which is controlled by them does not affect the control which is carried out using the cursor and the main object marker.

Consequently, the second function (e.g. an emergency function) can be executed without having to interrupt the execution in progress of the first function (e.g. a usual function which was planned in advance), the two executions being controlled by the same operator.

Additionally, since the auxiliary object marker is subjected to discrete displacement, it being possible to carry out such a discrete displacement in a precise manner in any situation, in particular while the aircraft is being shaken, execution of an emergency function can, thanks to the invention, be carried out whatever the phase and/or conditions of flight, and in particular when the aircraft is in an area of turbulence.

In a preferred embodiment, said auxiliary control means are fitted in a separate, specific box, which has keys, and said displacement and confirmation elements (to control the auxiliary object marker) are the keys of this specific box.

In another embodiment, said elements for displacement and confirmation of the auxiliary control means (to control the auxiliary object marker) can be the keys of an ordinary keyboard which enables said operator to enter data.

Additionally, in a particular variant, to reduce the space requirement, said cursor control device is not an independent device, but is also formed by some of the keys of said keyboard. Thus, in this case, said (only) keyboard is used simultaneously:

to enter data into the system;

to control the auxiliary object marker; and to control the cursor (i.e. the main object marker).

To do this, different combinations of keys of the keyboard are simply used to carry out, respectively, the different tasks.

Additionally, to facilitate the designation of responsive objects, in an advantageous embodiment, said responsive objects are arranged in at least one direction which is defined with respect to said interactive window, e.g. vertically or horizontally, and said auxiliary control means include at least one displacement element which corresponds to a direction arrow which makes it possible to displace the auxiliary object marker from one responsive object to another, responsive object after responsive object, following said defined direction in a certain way.

Additionally and advantageously, said cursor control device and said auxiliary control means are formed such that control of the main object marker by said cursor control device has priority over control of the auxiliary object marker by said auxiliary control means when the two markers, main and auxiliary, are on the same interactive window.

In a first embodiment, said cursor control device causes, in the usual way, a continuous displacement of the cursor on the interactive window, whereas, in a second embodiment, said cursor control device causes, also in the usual way, a discrete displacement of the cursor on the interactive window.

Additionally, to provide great flexibility of use and increase the operator's comfort in the execution of his or her tasks, the dialog device according to the invention can include two cursor control devices which are arranged in such a way that they can both be actuated by said operator, one of said cursor control devices causing continuous displacement of the cursor and the other causing discrete displacement of said cursor.

Additionally and advantageously, said cursor control device includes means for displacing the cursor from window to window and, when the dialog device includes at least two screens, a means for displacing the cursor from screen to screen. Preferably, each screen includes multiple fields, and displacement of the cursor from field to field is implemented in such a way that displacement from a first window to a second window is obtained indirectly by displacement of the cursor from the last field of the first window to the first field of the second window.

In a preferred embodiment, said dialog device includes two cursor control devices and two sets of auxiliary control means, one cursor control device and one set of auxiliary control means being intended for the pilot of the aircraft, and the other cursor control device and the other set of auxiliary control means being intended for the copilot of the aircraft.

This invention also concerns an aircraft system as above, which is notable in that it includes said dialog device according to the invention, to allow a dialog with an operator, in particular a pilot, of said aircraft.

BRIEF DESCRIPTION OF THE DRAWINGS

The figures of the attached drawing will give an understanding of how the invention can be implemented. On these figures, identical references designate similar elements.

DESCRIPTION OF THE PREFERRED EMBODIMENTS

Figure 1:
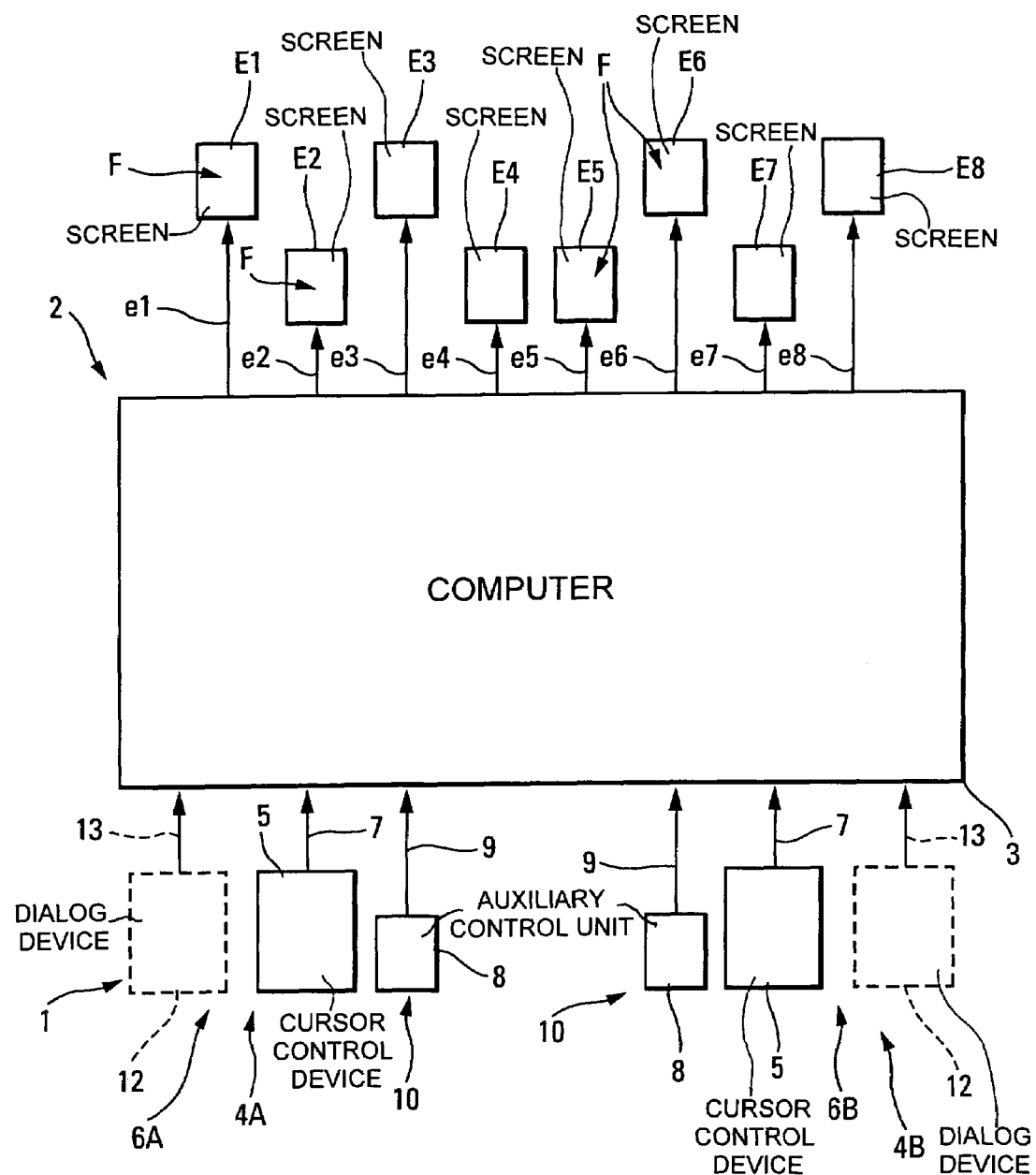
FIG. 1 is the block diagram of a dialog device according to the invention which is associated with a system of an aircraft.

The dialog device 1 according to the invention and represented schematically in FIG. 1 is placed on board an aircraft (not shown), preferably a civil transport airplane, and is preferably arranged on the flight deck of said aircraft. This dialog device 1 is intended to allow dialog between at least one operator of the aircraft, in particular a pilot, and a known system, e.g. a flight management system (not shown).

The dialog device 1 is associated with an assembly 2 which includes a computer 3 and multiple screens E1 to E8 which are linked, via links e1 to e8 respectively, to said computer 3.

In the preferred (but not exclusive) embodiment, which is represented in FIG. 1, the assembly 2 is partly divided into two, one part of said system being intended for the pilot, e.g. the left part 4A, and the other part (the right part 4B) being intended for the copilot. With such a distribution, preferably, screens E1 to E3 are intended for the pilot, screens E6 to E8 for the copilot, and screens E4 and E5 are common to both.

Screens E1 to E8, which are of the known Liquid Crystal Display (LCD) type, each include at least one display window F.

Each of said display windows F is a so-called "interactive window", i.e. a window which includes responsive objects (points, ranges, alphanumeric values, lists, menus, etc.) which can be designated or marked by an object marker [main (object) marker M1, auxiliary (object) marker M2], each of said responsive objects OS being associated with a particular function. The appearance of the main marker M1 on a responsive object OS can be caused by controlling a cursor CU which can be displaced by a cursor control device 5. The dialog device 1 includes two identical devices 5, one of which is part of a set of controls 6A of the pilot and the other is part of a set of controls 6B of the copilot. Said cursor control devices 5 are linked via links 7 to the computer 3.

Figure 5:
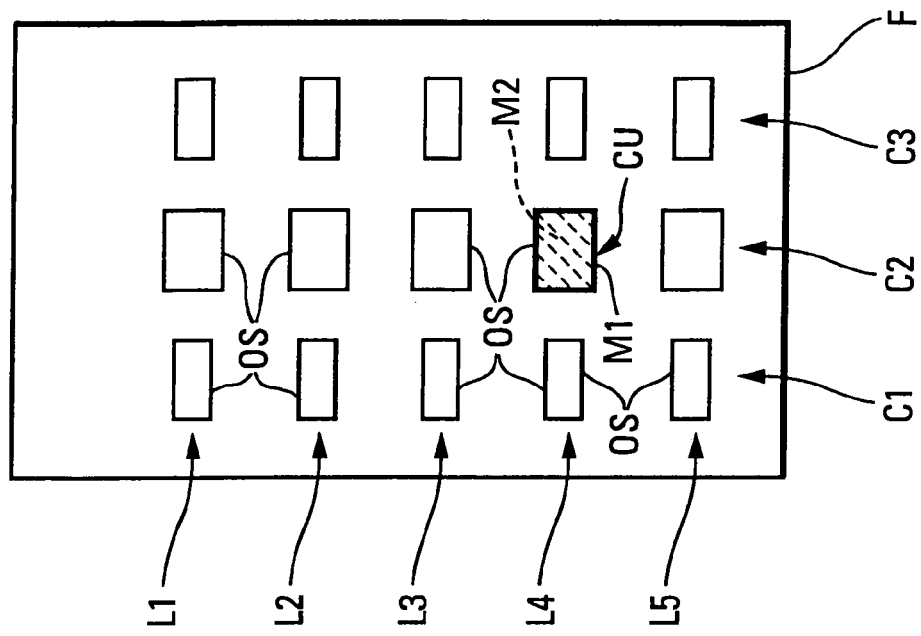
FIGS. 4 and 5 show, schematically, active windows with responsive objects, making it possible to explain the priority control mode which is provided according to this invention.

Operating one of said devices 5 makes it possible to displace said cursor CU in such a way as to take it onto a responsive object OS to designate it, i.e. to make the main marker M1 appear, as shown in FIG. 5. When a responsive object OS is designated using the cursor CU, it is then marked or highlighted, in particular by a change of appearance such as a change of color or increased brightness. The corresponding change of appearance of the main marker M1 is indicated by a thicker outline of the responsive object OS in FIG. 5. Execution of a function which is associated with a responsive object OS is initiated by confirmation (using a device 5) of said responsive object OS, which has previously been designated by said cursor CU (i.e. it has said main marker M1).

According to the invention, said dialog device 1 includes, additionally, auxiliary control means 8, which are linked by a link 9 to the computer 3, which are arranged so that they can also be actuated by said operator, which are intended to control the auxiliary marker M2 without affecting control of said main marker M1, and which include for this purpose:
  at least one actuatable displacement element, as defined below, making it possible to cause a discrete displacement of said auxiliary marker M2, responsive object OS by responsive object OS, on an interactive window F; and
  at least one actuatable confirmation element, as defined below, making it possible to confirm a responsive object OS which has said auxiliary marker M2, in such a way as to initiate execution of the function which is associated with said responsive object OS.

In the example which is shown in FIG. 1, each set of controls 6A and 6B includes such auxiliary control means 8.

Thus, when, during execution of a particular function (which has been controlled in the usual way by designating and confirming a responsive object OS using said cursor control device 5 controlling the cursor CU), another function, e.g. an emergency function, must be executed, an operator (the pilot or copilot) who has access to both said cursor control device 5 and the auxiliary control means 8, can initiate execution of this second function using said auxiliary control means 8, without affecting the function in progress, since the auxiliary object marker M2 which is controlled by them does not affect the control which is carried out using the cursor CU.

Consequently, the second function (e.g. an emergency function) can be executed without having to interrupt the execution in progress of the first function (e.g. a usual function which was planned in advance), the two executions being controlled by the same operator.

Additionally, since the auxiliary marker M2 is subjected to a discrete displacement, it being possible to carry out such a discrete displacement in a precise manner in any situation, in particular while the aircraft is being shaken, execution of an emergency function can, thanks to the invention, be carried out whatever the phase and/or conditions of flight, and in particular when the aircraft is in an area of turbulence.

Figure 3:
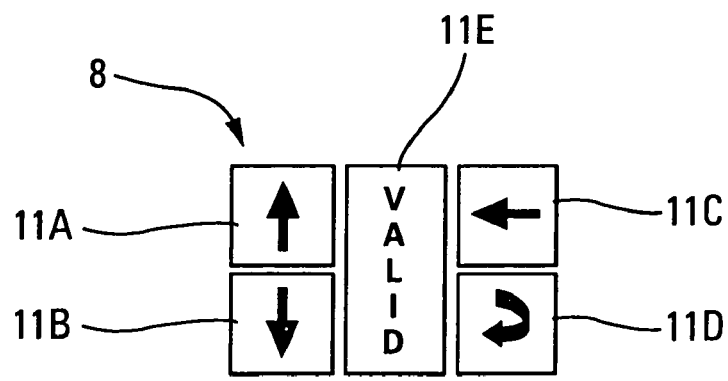
FIG. 3 shows a set of keyboard keys which are used to control an auxiliary marker.

In a preferred embodiment, the auxiliary control means 8 include keys 11A to 11D, which are shown in FIG. 3 and are part of a separate, specific box (not shown).

Figure 2:
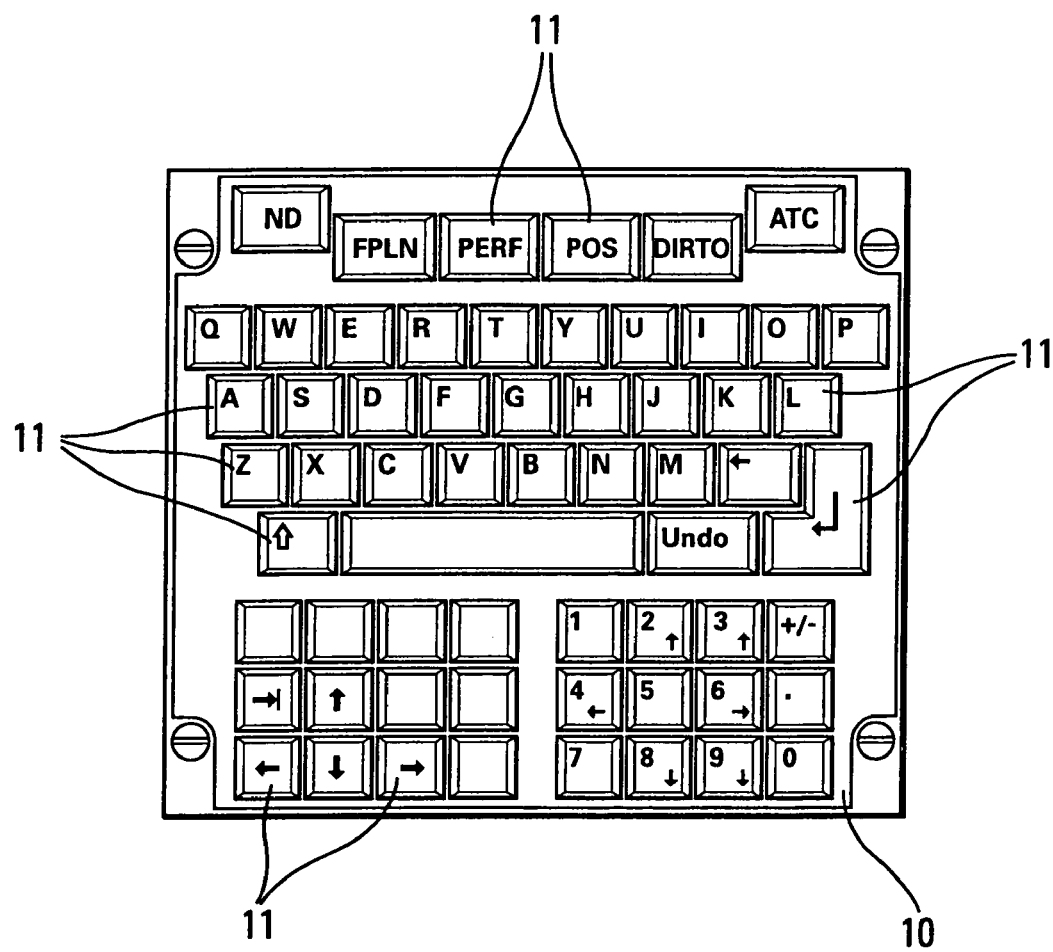
FIG. 2 represents schematically a keyboard of a dialog device according to the invention.

Each of said sets of controls 6A, 6B also includes a normal keyboard 10 which is shown in FIG. 2, and includes keys 11 which enable an operator to enter alphanumeric data into said computer 3.

Additionally, in a particular embodiment, the auxiliary control means 8 include keys 11A to 11D, some of which (e.g. keys 11A, 11B and 11C in the example of FIGS. 2 and 3), or even all, are part of said keyboard 10. It is thus unnecessary to provide an independent box to implement this invention, i.e. to form the auxiliary control means 8 which are intended to control the auxiliary marker M2.

In the example shown in FIG. 3:

keys 11A to 11C represent the displacement elements, i.e. they are intended to displace the auxiliary marker M2 on an interactive window F;

key 11D is used to displace said auxiliary marker M2 from one screen to another, preferably cyclically; it can also be used to displace said auxiliary marker M2 from one window F to another window F, in the case that a screen includes more than one window; and key 11E represents said confirmation element.

According to the invention, on at least some of the windows F, responsive objects OS are available in a suitable form for the keys of the auxiliary control means 8 (whatever they are: keys of a specific box or particular keys 11 of the keyboard 10), and are used for discrete displacement of said auxiliary marker M2 from one responsive object OS to another.

Figure 4:
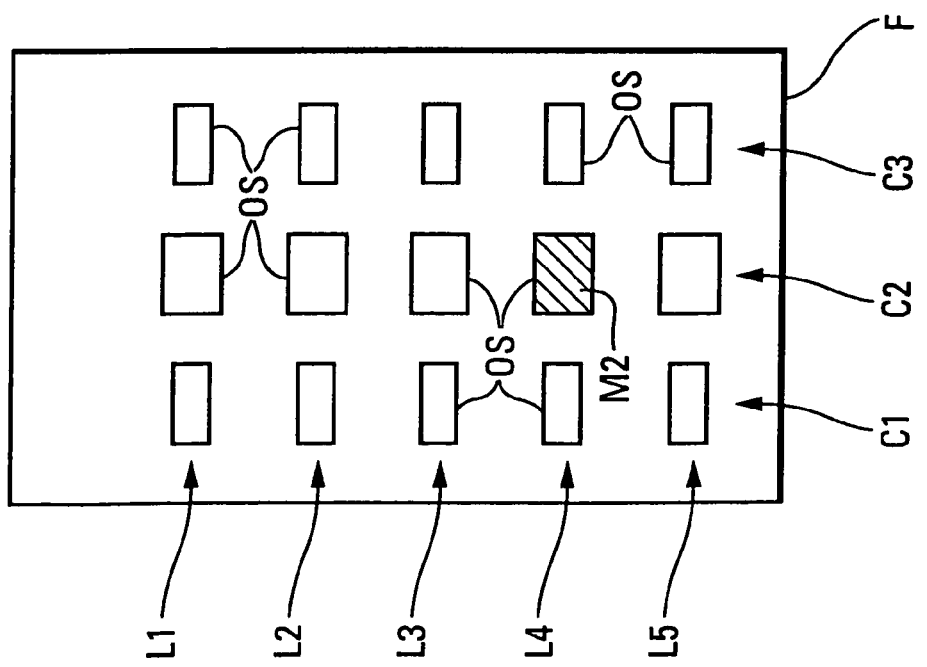

In the example of FIGS. 4 and 5, the responsive objects OS are arranged in columns C1 to C3 and rows L1 to L5, in such a way that the direction arrow keys "←", "↑", "↓" and "→" are sufficient to control the displacement of the auxiliary marker M2.

If the responsive objects OS are arranged according to a single direction (row or column), two keys may be enough, e.g. "←" and "→" in the case of arrangement in a row and "↑" and "↓" in the case of arrangement in a column, making it easier to control displacement of the auxiliary marker M2.

According to the invention, for each set of controls 6A, 6B, said cursor control device 5 and said auxiliary control means 8 are formed such that control of the main object marker M1 by said cursor control device 5 has priority over control of the auxiliary object marker M2 by said auxiliary control means 8 when the two markers, main and auxiliary, are on the same interactive window F, as can be seen in FIGS. 4 and 5, making it possible to simplify the use of these two control means 5 and 8.

In FIG. 4, the responsive object OS, which is in position C2-L4, has the auxiliary marker M2 (shown by hatching). This responsive object OS can thus be confirmed by the confirmation means 11E of the auxiliary control means 8, and the function which is associated with it can then be executed.

The cursor CU is not in this interactive window F.

When the cursor CU is displaced on this interactive window F, e.g. to designate the responsive object OS at position C2-L4, the main marker M1 appears on this responsive object OS and the auxiliary marker M2 disappears, although it has not been displaced [to illustrate this situation, the (inactive) presence of said auxiliary marker M2 is indicated by hatching with broken dashes].

Additionally, if the cursor CU, and thus the main marker M1, again leave this interactive window F, the auxiliary marker M2 reappears, obviously if it has not been displaced meanwhile, and can then be used to activate the function which is associated with the responsive object OS of this position C2-L4.

According to the invention, the cursor control device 5 is a device which includes, in the usual way, means (not shown), making it possible to:

displace the cursor CU on an interactive window F in order to designate a responsive object OS;

displace said cursor CU from screen to screen and/or from window to window; and confirm a responsive object OS, which is designated by a cursor CU in such a way as to initiate execution of the function which is associated with said responsive object OS.

According to the invention, in a first embodiment, said cursor control device 5 is in a form such that it causes, in the usual way, a continuous displacement of the cursor CU on the interactive window F, whereas, in a second embodiment, said cursor control device 5 is in a form such that it causes, also in the usual way, a discrete displacement of the cursor CU on the interactive window F.

In this second embodiment, in a preferred variant, said device 5 for controlling the cursor CU is not a specific device, but is simply formed from some of the keys 11 of the keyboard 10.

In this case, said keyboard 10 can be used simultaneously:
to enter data into the system 1;
to control the main marker M1; and
to control the auxiliary marker M2.

To do this, different combinations of keys 11 of the keyboard 10 are simply used to carry out, respectively, the different tasks.

Additionally, in a third embodiment, each set of controls 6A, 6B includes, as well as the cursor control device 5, another cursor control device 12 which is linked via a link 13 to said computer 3, as shown by broken dashes in FIG. 1, and which also makes it possible to control (designate and confirm) said cursor CU.

In this case, each of the operators (pilot, copilot) has available two devices 5 and 12 to control the cursor CU, so that in the case of a failure of one of his or her control devices 5 and 12, he or she can still use the other control device to initiate execution of functions, which of course increases the reliability of said dialog device 1.

Preferably, one of said devices 5 and 12 is in a form which causes a discrete displacement of the cursor CU, and the other is in a form which causes a continuous displacement of said cursor CU. Since each operator (pilot, copilot) thus has available two control devices 5 and 12, which are complementary but different from each other, he or she can choose whichever is more convenient (either throughout the flight, or temporarily depending on phases and/or conditions of flight), to control the cursor CU, which provides great flexibility of use and increases the comfort of said pilot and copilot in the execution of their tasks.

The invention claimed is:

1. A dialog device for dialog between an operator of an aircraft and a system of said aircraft, said dialog device comprising:

at least one screen that displays at least two responsive objects on one or more interactive windows, each of said responsive objects being associated with one of multiple functions, said functions for being initiated by said dialog device under action of the operator so that they are executed;

at least one cursor control device arranged to be actuated by said operator and including:

an actuatable displacement means that causes continuous displacement of a cursor on at least one of said interactive windows to designate one of the responsive objects, by making a main object marker appear, and an actuatable confirmation means that confirms the one of said responsive objects, which has said main object marker, to initiate execution of the function which is associated with said one of said responsive objects; and auxiliary control means, which are arranged so that they can also be actuated by said operator, that control an auxiliary object marker without affecting control of said main object marker, said auxiliary control means comprising at least:

an actuatable displacement element that discretely displaces said auxiliary object marker, responsive object-by-responsive object, on the at least one of the interactive windows, and an actuatable confirmation element that confirms one of the responsive objects, which has said auxiliary object marker, to initiate execution of the function associated with said one of said responsive objects confirmed by said actuatable confirmation element, wherein:

control of the main object marker by said cursor control device always has priority over control of the auxiliary object marker by said auxiliary control means when the two markers, main and auxiliary, are on the same interactive window.

2. A dialog device for dialog between an operator of an aircraft and a system of said aircraft, said dialog device comprising:

a single screen that displays two responsive objects on each of two interactive windows, each of said responsive objects being associated with one of multiple functions, said dialog device for initiating said functions under the action of the operator so that they are executed;

a cursor control device arranged to be actuated by said operator and comprising:

one actuatable displacement means that displaces, continuously or discretely, a cursor on one of the two interactive windows to designate a first of the four responsive objects, by making a main object marker appear, and one actuatable confirmation means that confirms the first responsive object, which has said main object marker, to initiate execution of the function which is associated with said first responsive object; and auxiliary control means, arranged to also be actuated by said operator, and to control an auxiliary object marker without affecting control of said main object marker, said auxiliary control means comprising:

an actuatable displacement element that discretely displaces said auxiliary object marker, responsive object-by-responsive object, on the two interactive windows, and an actuatable confirmation element that confirms a second of the four responsive objects, which has said auxiliary object marker, to initiate execution of the function associated with said second responsive object, wherein:

said cursor control device causes either continuous or discrete displacement of the cursor on the screen, control of the main object marker by said cursor control device has priority over control of the auxiliary object marker by said auxiliary control means when the two markers, main and auxiliary, are on the same interactive window, the function associated with said second responsive object is an emergency function that can be executed without interrupting the function associated with said first responsive object, and the functions associated with said first and second responsive objects are controlled by the same operator.

3. The device of claim 2, wherein said displacement and confirmation elements of the auxiliary control means are keys of a specific box.

4. The device of claim 2 further comprising:
a keyboard to enable said operator to enter data, wherein said displacement and confirmation elements of the auxiliary control means are keys of said keyboard.

5. The device of claim 3, wherein said cursor control device includes some of the keys of said keyboard.

6. The device of claim 2, wherein:
said responsive objects are arranged according to at least one direction which is defined on each of said interactive windows, and
said auxiliary control means include a directional displacement element, which corresponds to a direction arrow, that displaces the auxiliary object marker from one responsive object to another, responsive object-after-responsive object, in said one direction in a chosen sense.

7. The device of claim 2, wherein said cursor control device includes a window selecting means for displacing the cursor from one of the two interactive windows to the other.

8. The device of claim 2, further comprising:
another screen, wherein
said cursor control device includes a screen selecting means for displacing the cursor from one of the two screens to the other.

9. The device of claim 2, further comprising:
another cursor control device; and
another auxiliary control means, wherein:
one cursor control means and one set of auxiliary control means are for the pilot of the aircraft, and
the other cursor control device and the other set of auxiliary control means are for the copilot of the aircraft.

10. An aircraft device that comprises a dialog device as specified in claim 2, to allow a dialog between said aircraft device and the operator of said aircraft.

11. The device of claim 2, wherein:
said responsive objects are arranged according to at least one direction which is defined on each of said interactive windows, and
said auxiliary control means include a directional displacement element, which corresponds to a direction arrow, that displaces the auxiliary object marker from one responsive object to another, responsive object-after-responsive object, in said one direction in a chosen sense.

12. The device of claim 2, further comprising:
another auxiliary control means, wherein:
one cursor control means and one set of auxiliary control means are for the pilot of the aircraft, and
the other cursor control device and the other set of auxiliary control means are for the copilot of the aircraft.

13. The dialog device of claim 4, further comprising:
a second cursor control device,
a second auxiliary control means,
wherein the first cursor control device and the first auxiliary control means are physically displaced from the second control device and the second auxiliary control means.

14. The dialog device of claim 13, wherein:
said second cursor control device is different from the first cursor control device, and
said second auxiliary control means is different from the first auxiliary control means.

15. A dialog device for dialog between an operator of an aircraft and a system of said aircraft, said dialog device comprising:
a single screen that displays two responsive objects on each of two interactive windows, each of said responsive objects being associated with one of multiple functions, said dialog device for initiating said functions by said dialog device under the action of the operator so that they are executed;
a cursor control device arranged to be actuated by said operator comprising:
one actuatable displacement means that discretely displaces a cursor on one of the two interactive windows to designate a first of the four responsive objects, by making a main object marker appear, and
one actuatable confirmation means that confirms the first responsive object, which has said main object marker, to initiate execution of the function which is associated with said first responsive object; and
auxiliary control means, arranged to also be actuated by said operator, and to control an auxiliary object marker without affecting control of said main object marker, said auxiliary control means comprising:
an actuatable displacement element that continuously displaces said auxiliary object marker, responsive object-by-responsive object, on the two interactive windows, and
an actuatable confirmation element that confirms a second of the four responsive objects, which has said auxiliary object marker, to initiate execution of the function associated with said second responsive object, wherein:
said cursor control device causes continuous displacement of the cursor on the screen,
control of the main object marker by said cursor control device has priority over control of the auxiliary object marker by said auxiliary control means when the two markers, main and auxiliary, are on the same interactive window,
the function associated with said second responsive object is an emergency function that can be executed without interrupting the function associated with said first responsive object, and
the functions associated with said first and second responsive objects are controlled by the same operator.

16. A dialog device for dialog between an operator of an aircraft and a system of said aircraft, said dialog device comprising:
a single screen that displays two responsive objects on each of two interactive windows, each of said responsive objects being associated with one of multiple functions, said dialog device for initiating said functions under action of the operator so that they are executed;
a cursor control device for being actuated by said operator comprising:
one actuatable displacement means that is operable to continuously displace a cursor on one of the two interactive windows to designate a first of the four responsive objects, by making a main object marker appear, and
one actuatable confirmation means that confirms the first responsive object, which has said main object marker, to initiate execution of the function which is associated with said first responsive object; and
auxiliary control means, for being actuated by said operator, to control an auxiliary object marker without affecting control of said main object marker, said auxiliary control means comprising:
an actuatable displacement element that displaces said auxiliary object marker, responsive object-by-responsive object, on the two interactive windows, and
an actuatable confirmation element that confirms a second of the four responsive objects, which has said auxiliary object marker, to initiate execution of the function associated with said second responsive object, wherein:
said cursor control device causes discrete displacement of the cursor on the screen,
control of the main object marker by said cursor control device has priority over control of the auxiliary object marker by said auxiliary control means when the two markers, main and auxiliary, are on the same interactive window,
the function associated with said second responsive object is an emergency function that can be executed without interrupting the function associated with said first responsive object, and
the functions associated with said first and second responsive objects are controlled by the same operator.

* * * * *